(12) United States Patent
Mindl et al.

(10) Patent No.: US 6,343,670 B1
(45) Date of Patent: Feb. 5, 2002

(54) STEERING DEVICE FOR A MOTOR VEHICLE

(75) Inventors: Anton Mindl, Ludenscheid; Frank Blasing, Werl; Detlef Kerkmann, Nachrodt; Klaus Nieding, Halver, all of (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 09/562,714

(22) Filed: May 2, 2000

(30) Foreign Application Priority Data

May 3, 1999 (DE) .......................... 199 20 092

(51) Int. Cl.[7] .............. B62D 5/04; B62D 5/06
(52) U.S. Cl. .................. 180/443; 180/400
(58) Field of Search ............... 180/443, 400; 324/207.25

(56) References Cited

U.S. PATENT DOCUMENTS 5,743,350 A * 4/1998 Yamawaki et al. ......... 180/443
5,899,294 A * 5/1999 Shimizu et al. ............ 180/443
6,161,644 A * 12/2000 Kim ........................ 180/443

FOREIGN PATENT DOCUMENTS

| DE | 198 22 170 A1 | 12/1998 |
|---|---|---|
| DE | 197 36 346 C1 | 1/1999 |
| EP | 0 447 626 B1 | 2/1995 |

* cited by examiner

*Primary Examiner*—Brian L. Johnson
*Assistant Examiner*—Matthew Luby
(74) *Attorney, Agent, or Firm*—Brooks & Kushman P.C.

(57) ABSTRACT

The invention proposes a steering device for a motor vehicle which contains an inductive module for the contactless transmission of electric energy and data between the motor vehicle and the steering wheel, for measuring the rotational angle of the steering wheel and for generating torque between the motor vehicle and the steering wheel, with the inductive module containing a stator that is connected to the motor vehicle in a torsionally rigid fashion and a rotor that is connected to the steering wheel in a torsionally rigid fashion. Such a device should be realized in the form of a compact unit that has a very small space requirement due to the utilization of inductive principles, with said unit consisting of only a few components such that it can be manufactured in a particularly inexpensive fashion. This unit is based on an inductive module that contains a resolver-based rotation sensor and an annular rotary-field motor, with the stator and the rotor containing coils that cooperate with one another in such a way that an inductive coupling exists between the respective coils on the stator side, which are provided for realizing the rotation sensor function and the rotary-field motor function, and the respectively assigned coils on the rotor side.

13 Claims, 3 Drawing Sheets

Section A-A

Section B-B

STEERING DEVICE FOR A MOTOR VEHICLE

TECHNICAL FIELD

The invention pertains to a steering device for a motor vehicle which contains an inductive module for the contactless transmission of electric energy and data between the motor vehicle and the steering wheel, for measuring the rotational angle of the steering wheel and for generating torque between the motor vehicle and the steering wheel, with the inductive module containing a stator that is connected to the motor vehicle in a torsionally rigid fashion and a rotor that is connected to the steering wheel in a torsionally rigid fashion.

BACKGROUND ART

DE 197 36 346 C1 discloses a device for transmitting electric energy between the motor vehicle side and the steering wheel side of a motor vehicle which utilizes a resolver-based rotation sensor. The corresponding method, in particular, indicates that this device is also able to simultaneously determine the rotational angle of the steering wheel and to transmit data between the steering wheel side and the motor vehicle side.

However, this publication does not discuss the possibility of using such a device for generating torque between the steering wheel and the motor vehicle.

The generation of such torque is, for example, known in conventional steering mechanisms for motor vehicles in order to boost the steering forces exerted by the driver of the motor vehicle or in so-called "steer-by-wire" steering devices in order to generate counter steering moments for realizing a haptic feedback for the driver of the motor vehicle.

For example, DE 198 22 170 A1 discloses a power steering device for generating a steering boost in reaction to a steering control signal. In this case, electromotor means are used for generating the boosting forces, with the electric motor arranged within the region of the steering gear inevitably resulting in a decentralized arrangement of the components.

EP 04 47 626 B1 discloses an actuator for a cybernetic steering system, in which electric motors arranged axially referred to a steering spindle are provided in order to generate torques for moving a steering pinion of the power steering system as well as for simulating a steering moment in the steering wheel.

The utilization of the same technical principle for the transmission of energy and data into the steering wheel as well as the simultaneous measurement of the steering angle is neither disclosed in this application nor considered apparent as particularly evident from the chosen arrangement distant from the steering wheel.

SUMMARY OF THE INVENTION

Based on the previously cited state of the art, the invention aims to develop a steering device for a motor vehicle, in which the tasks of energy and data transmission between the motor vehicle and the steering wheel, steering angle measurement and torque generation are realized with one compact component that exclusively utilizes inductive principles. It should be possible to realize such a unit which has a very small space requirement with the least number of components possible and in a particularly inexpensive fashion.

This objective is attained due to the fact that the steering device is based on an inductive module that contains a stator that is connected to the motor vehicle in a torsionally rigid fashion and a rotor that is connected to the steering wheel in a torsionally rigid fashion, as well as a resolver-based rotation sensor for the contactless transmission of electric energy and data between the motor vehicle and the steering wheel and for measuring the rotational angle of the steering wheel, and an annular rotary-field motor for generating torque between the motor vehicle and the steering wheel, with the stator and the rotor containing coils that cooperate with one another in such a way that an inductive coupling exists between the coils on the stator side which are provided for realizing the rotation sensor function and the rotary-field motor function and the respectively assigned coils on the rotor side.

In the steering device according to the invention, at least three coils are respectively provided on the stator side and on the rotor side on the periphery of a circle around the axis of rotation of the steering wheel in order to realize the rotation sensor function and the rotary-field motor function, with the respective coils being equidistantly spaced apart.

In order to prevent gaps in the overlap between the coils on the rotor side and the coils on the stator side, the number and/or arrangement of the coils on the stator side, in particular, differ(s) from the number and/or arrangement of the respectively assigned coils on the rotor side.

According to one embodiment, the coils are arranged concentric to one another in a plane that lies perpendicular to the rotational axis of the steering wheel. In another embodiment, the coils are arranged in planes that are axially offset relative to one another, with the axes of the coils being aligned radial or parallel referred to the rotational axis of the steering wheel in both aforementioned embodiments.

A particularly effective inductive coupling between the stator and the rotor can be achieved if they contain flux guide elements that are essentially realized in an annular fashion and have an E-shaped radial cross section in the region of the coils and a U-shaped radial cross section in the region between the coils, with the flux guide elements consisting, in particular, of a thermoplastic plastic material that is filled with a low-retentivity material The flux guide elements are preferably realized by means of a thermoplastic extrusion coating of the coils with plastic that is filled with a low-retentivity material.

An even more compact unit that, due to the additional elimination of components, is also particularly inexpensive can be achieved if the same coils are provided on the stator side in order to realize the rotation sensor function and the rotary-field motor function.

The space requirement and the costs can be additionally reduced with an embodiment in which the same coils are provided on the stator side and on the rotor side in order to realize the rotation sensor function and the rotary-field motor function. In this case, individual coils or groups of coils of the stator and the rotor can be controlled in a chronologically offset fashion.

The invention also proposes that the steering wheel be directly connected to a steering gear that influences the position of the motor vehicle wheels with the aid of a steering rod assembly via a steering spindle. In this case, the torques generated by the rotary-field motor are used for boosting the steering forces exerted by the driver of the motor vehicle. Alternatively, the angular position of the steering wheel which is determined by the rotation sensor is used for influencing the position of the motor vehicle wheels by means of electromotor driven means, with the torques generated by the rotary-field motor being used as counter steering moments for realizing a haptic feedback for the driver of the motor vehicle.

Additional advantages of the invention are disclosed as well as the following description of the embodiments that are illustrated in the figures and elucidate the design and function of the device according to the invention.

BEST MODES FOR CARRYING OUT THE INVENTION

Figure 1:
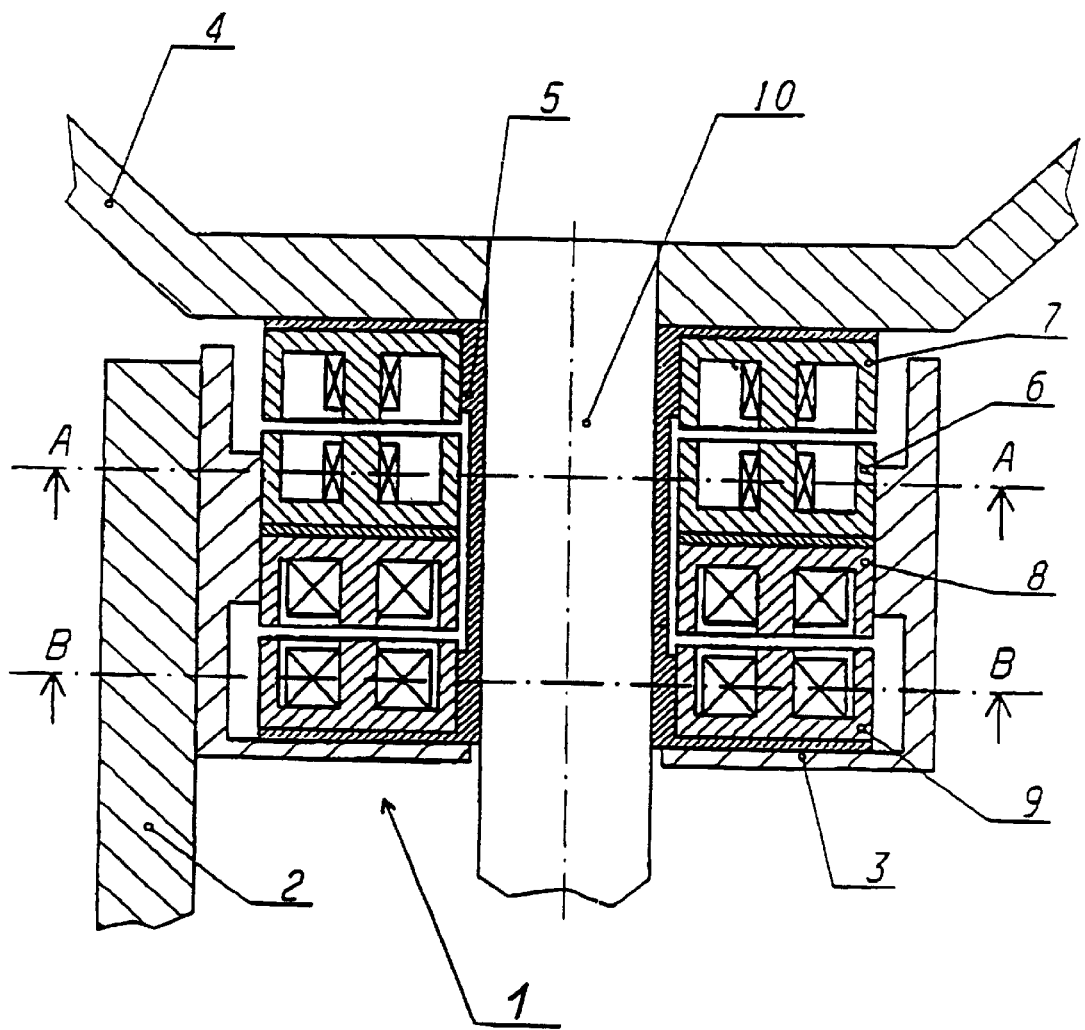
FIG. 1, a schematic sectional representation of a steering wheel that is mounted on a rotating axle as well as a module according to the invention which is mounted on the steering wheel.

FIG. 1 shows that the steering device according to the invention contains an inductive module 1. The essential components of this inductive module consist of a stator 3 that is connected to the motor vehicle 2 in a torsionally rigid fashion and a rotor 5 that is connected to the steering wheel 4 in a torsionally rigid fashion. In this case, the stator 3 as well as the rotor 5 contain annular flux guide elements 6, 7, 8, 9 that are arranged concentric the steering spindle 10 to the rotational axis of the steering wheel and, for example, consist of a thermoplastic plastic material that is filled with a low-retentivity material.

Figure 2A:
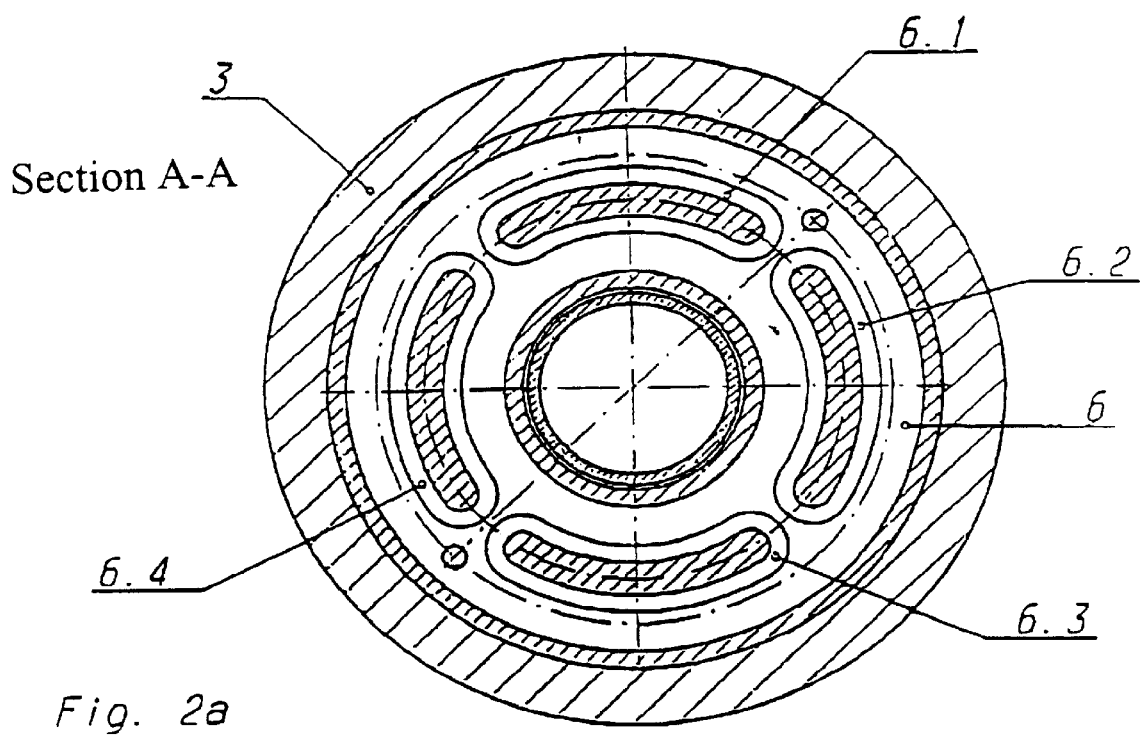
FIG. 2, a cross section through a flux guide body on the stator side or the rotor side (e.g., along the line A—A or B—B in FIG. 1) with an equidistant arrangement of a) 4 coils b) 6 coils, and FIG. 3, a schematic sectional representation of a steering wheel that is mounted on a rotating axle, as well as a module according to alternative embodiment of the invention which is mounted on the steering wheel, with the same stator coils being provided for the sensor function as well as the motor function.

The flux guide body 6 which, according to FIG. 2a, carries coils 6.1, . . . , 6.4 wound from enameled copper wire, cooperates with the similarly designed flux guide body 7 that, however, contains six coils 7.1, . . . , 7.6 which are arranged on the periphery of a circle in an equidistant arrangement in order to realize a rotation sensor for the contactless transmission of electric energy and data between the motor vehicle 2 and the steering wheel 4, as well as for measuring the rotational angle of the steering wheel 4. In this case, the flux guide body 6 is connected to the stator 3 in a torsionally rigid fashion, and the flux guide body 7 is connected to the rotor 5 in a torsionally rigid fashion. The rotation sensor is operated with two primary coils that are turned relative to one another by 90E and are respectively formed by the electric serial connection of the opposing coils 6.1 and 6.3 as well as 6.2 and 6.4. Consequently, a largely rotationally symmetrical arrangement for the transmission of energy and data is achieved.

The rotor side of the rotation sensor is designed similar to the stator side, however, with six coils 7.1, . . . , 7.6. In this case, two opposing coils are respectively connected to one another such that three secondary coils are formed which are turned relative to one another by 60E. The evaluation of the voltage of one of the secondary coils, in principle, suffices for measuring the angle. However, the other two secondary coils are required for maximizing the coupling between the primary side and the secondary side with respect to energy transmission and for preventing gaps in the overlap for angle measurement.

Due to the ohmic winding resistance and the leakage inductances of the rotation sensor, a load-dependent phase shift occurs between the primary voltage and the secondary voltage. Consequently, a buffer needs to be provided between the consumers on the secondary side, which have a chronologically different power requirement, and the secondary side of the sensor, with the buffer continuously applying a constant load current to the sensor in order to ensure a flawless determination of the steering angle at all times.

Figure 2B:
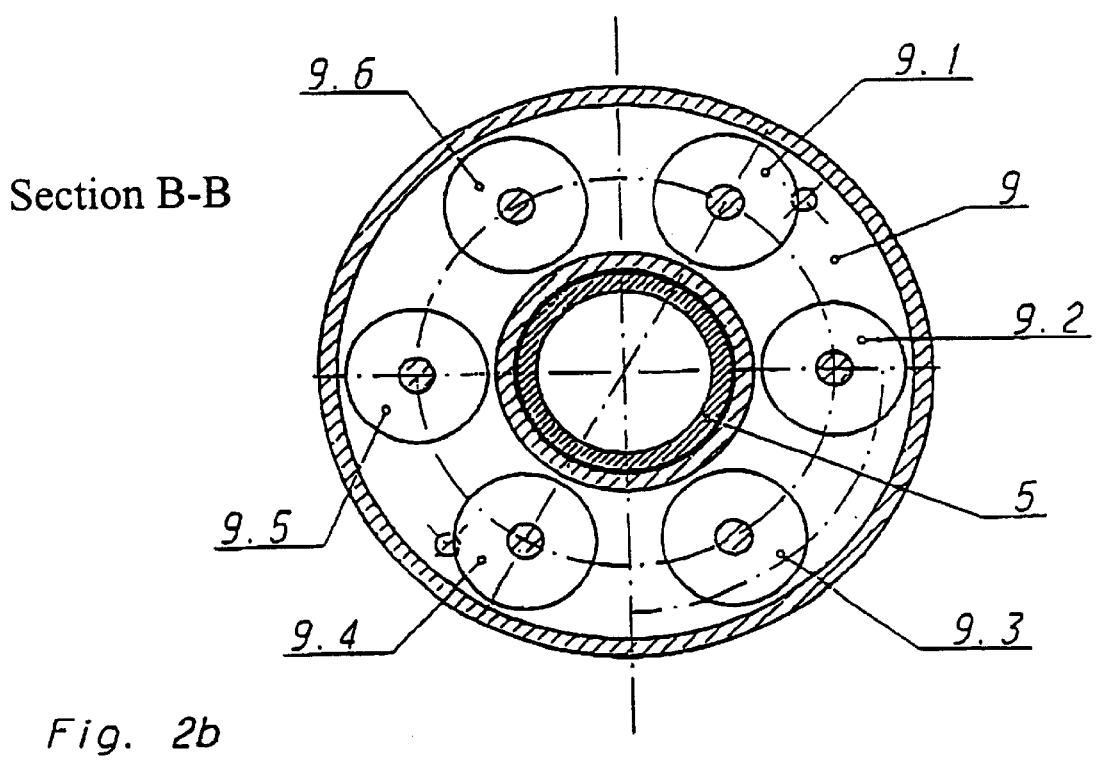

The flux guide elements 8 and 9, which are realized identically and respectively carry six coils 8.1, . . . , 8.6 and 9.1, . . . , 9.6 wound from enameled copper wire, cooperate with one another in order to realize a rotary-field motor for generating torque between the motor vehicle 2 and the steering wheel 4 as indicated in FIG. 2b. In this case, the flux guide body 8 is connected to the stator 3 in a torsionally rigid fashion, and the flux guide body 9 is connected to the rotor 5 in a torsionally rigid fashion. Similarly to the previously described rotation sensor, the field magnets which are turned relative to one another by 60E and generate a rotary magnetic field due to a corresponding control are also formed by the electric serial connection of the opposing coils on the stator side—in this case, 8.1 and 8.4, 8.2 and 8.5 as well as 8.3 and 8.6.

This rotary field is able to exert a torque upon a magnetic rotor that, for example, may simply consist of a dipole formed on the rotor side by two opposing coils 9.1 and 9.4 or a more complex magnetic structure formed by incorporating additional rotor coils.

Since it is possible to individually control the rotor coils 9.1–9.6, a "dynamic rotor" can be realized. Such a dynamic rotor makes it possible to generate arbitrary torque progressions within certain limitations in a rotary magnetic field with constant amplitude and angular velocity.

Figure 3:
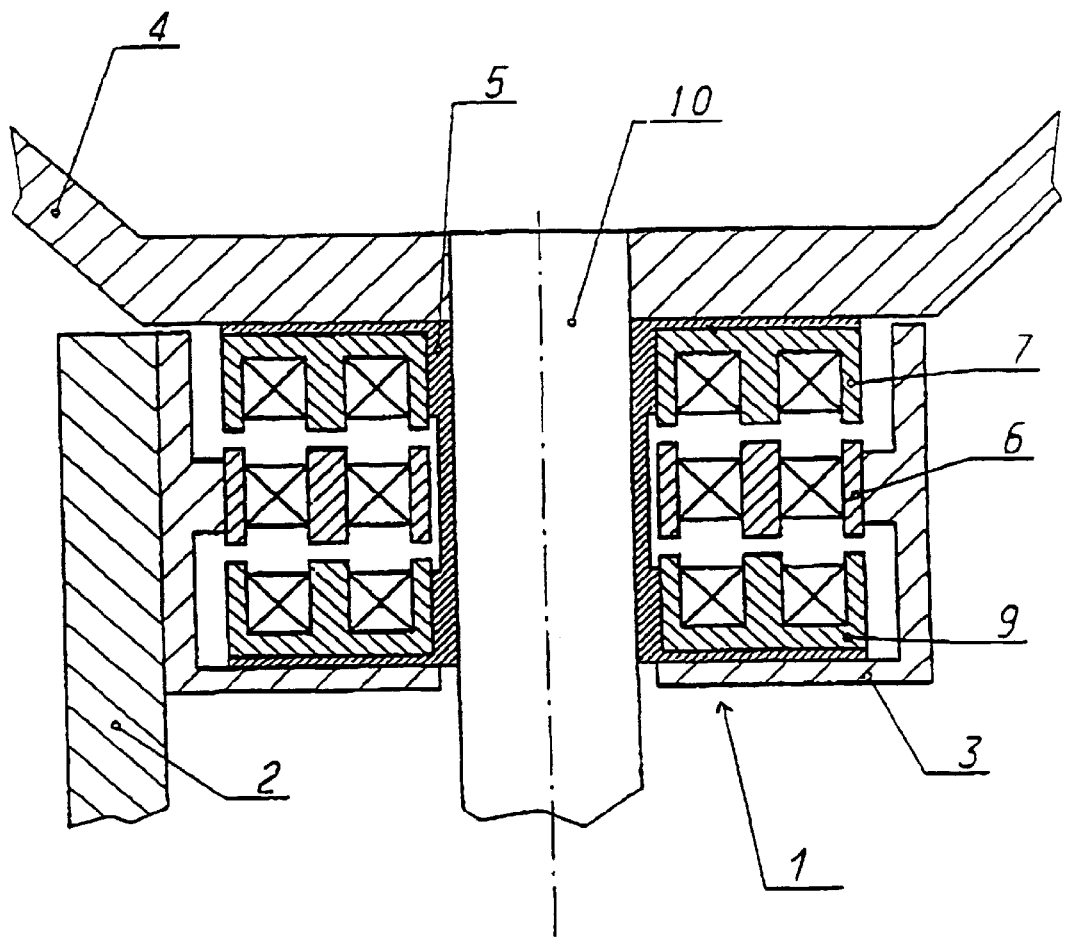

Consequently, the embodiment that is schematically illustrated in FIG. 3, and contains only one stator coil arrangement 6 that fulfills the function of the primary coils for the rotation sensor as well as the function of the field coils for the rotary-field motor, can be realized because a change in the amplitude or frequency of the control of the stator coils which would be damaging to the rotation sensor function, but absolutely imperative for the rotary-field motor function with a conventional "static" rotor, is not required in this case.

What is claimed is:

1. A steering device for a motor vehicle, the steering device comprising:

a steering wheel having a rotational axis;

a stator fixed to the motor vehicle, the stator having annular flux guide elements arranged concentric to the rotational axis of the steering wheel, each flux guide element of the stator having inductive coils; and a rotor fixed to the steering wheel, the rotor having annular flux guide elements arranged concentric to the rotational axis of the steering wheel, each flux guide element of the rotor having inductive coils;

wherein the inductive coils of a flux guide element of the stator and the inductive coils of a flux guide element of the rotor cooperate with one another so that an inductive coupling between the stator and the rotor forms a rotation sensor for communicating energy and data between the steering wheel and the motor and for measuring a rotational angle of the steering wheel;

wherein the inductive coils of a flux guide element of the stator and the inductive coils of a flux guide element of the rotor cooperate with one another so that an inductive coupling between the stator and the rotor forms an annular rotary field motor for generating torque between the steering wheel and the motor vehicle.

2. The steering device of claim 1 wherein:

the flux guide elements of the stator and the flux guide elements of the rotor include at least three inductive coils arranged concentrically around the rotational axis of the steering wheel and are spaced equidistantly apart.

3. The steering device of claim 1 wherein:

the inductive coils of the flux guide elements of the stator and the rotor are arranged concentric to one another in a plane lying perpendicular to the rotational axis of the steering wheel.

4. The steering device of claim 1 wherein:

the inductive coils of the flux guide elements of the stator and the rotor are arranged in planes axially offset relative to one another and lie perpendicular to the rotational axis of the steering wheel.

5. The steering device of claim 1 wherein:

the axes of the inductive coils of the flux guide elements of the stator and the rotor are aligned radially with respect to the rotational axis of the steering wheel.

6. The steering device of claim 1 wherein:

the axes of the inductive coils of the flux guide elements of the stator and the rotor are aligned parallel with respect to the rotational axis of the steering wheel.

7. The steering device of claim 1 wherein:

the number of inductive coils of the flux guide elements of the stator differ from the number of inductive coils of the flux guide elements of the rotor.

8. The steering device of claim 1 wherein:

the flux guide elements of the stator and the flux guide elements of the rotor have an E-shaped radial cross section in a region of the inductive coils and a U-shaped radial cross section in a region between the inductive coils.

9. The steering device of claim 8 wherein:

the flux guide elements of the stator and the rotor include a thermoplastic plastic filled with a low-retentivity material.

10. The steering device of claim 8 wherein:

the inductive coils of the flux guide elements of the stator and the rotor have an extruded thermoplastic coating.

11. The steering device of claim 1 wherein:

the rotary field motor generates torque between the steering wheel and the motor vehicle for boosting steering forces exerted by an operator of the motor vehicle on the steering wheel.

12. The steering device of claim 1 wherein:

the rotational angle of the steering wheel is measured by the rotation sensor for controlling the position of the motor vehicle.

13. The steering device of claim 1 wherein:

the torque generated by the rotary field motor exerts a counter steering moment for creating a haptic feedback for an operator of the motor vehicle.

\* \* \* \* \*